(12) United States Patent
Mercado

(10) Patent No.: US 11,667,483 B2
(45) Date of Patent: Jun. 6, 2023

(54) DRONE-ACTIVATED PACKAGE DELIVERY LOCKER

(71) Applicant: J. Mercado & Associates, Inc., Denver, CO (US)

(72) Inventor: James Martin Mercado, Denver, CO (US)

(73) Assignee: J. Mercado & Associates, Inc., Denver, CO (US)

( * ) Notice: Subject to any disclaimer, the term of this patent is extended or adjusted under 35 U.S.C. 154(b) by 563 days.

(21) Appl. No.: 16/738,709

(22) Filed: Jan. 9, 2020

(65) Prior Publication Data

US 2020/0231393 A1  Jul. 23, 2020

Related U.S. Application Data

(60) Provisional application No. 62/794,872, filed on Jan. 21, 2019.

(51) Int. Cl.
*B64F 1/32* (2006.01)
*B64D 1/02* (2006.01)
*B64C 39/02* (2023.01)
*B65G 67/00* (2006.01)
*B66B 1/34* (2006.01)
*B64F 1/36* (2017.01)

(52) U.S. Cl.
CPC ............. *B65G 67/00* (2013.01); *B64F 1/368* (2013.01); *B66B 1/3446* (2013.01); *B65G 2201/0285* (2013.01)

(58) Field of Classification Search
CPC .............. B64C 39/02; B64D 1/02; B64F 1/32
See application file for complete search history.

(56) References Cited

U.S. PATENT DOCUMENTS

| | | | | |
|---|---|---|---|---|
| 10,377,507 | B2* | 8/2019 | Tremblay | G08G 5/0026 |
| 10,410,105 | B1* | 9/2019 | Stoman | B65D 51/24 |
| 10,501,205 | B1* | 12/2019 | Siewert | B64F 1/32 |
| 10,703,507 | B2* | 7/2020 | Comerford | B64C 39/024 |
| 10,889,449 | B2* | 1/2021 | Umeyama | H02K 41/00 |
| 10,993,569 | B2* | 5/2021 | Gil | B64C 39/024 |
| 11,014,785 | B1* | 5/2021 | Marchese | B66B 9/003 |
| 11,027,843 | B2* | 6/2021 | Prager | G05D 1/101 |
| 11,066,186 | B2* | 7/2021 | Walsh | A47G 29/141 |
| 11,180,263 | B2* | 11/2021 | Ratajczak | B64D 27/24 |
| 11,259,663 | B2* | 3/2022 | Gil | B64F 1/32 |
| 11,379,784 | B1* | 7/2022 | Eastman | G06Q 10/083 |

OTHER PUBLICATIONS

US 2015/0175276 A1, Koster, Jun. 25, 2015.*
US 2019/0019141 A1, Torii et al., Jan. 17, 2019.*
US 2020/0113365 A1, Shobe, Apr. 16, 2020.*
US 2021/0394930 A1, O'Toole, Dec. 23, 2021.*

* cited by examiner

*Primary Examiner* — Douglas A Hess
(74) *Attorney, Agent, or Firm* — Boyle Fredrickson, S.C.

(57) ABSTRACT

A storage locker for drone delivery provides for weathertight doors that open automatically on sensing the approach of a drone and close to cover the package once deposited by the drone. The storage locker may be operated in conjunction with an elevator to allow elevated placement, removing drones from the vicinity of interfering structures, people, and pets.

10 Claims, 4 Drawing Sheets

DRONE-ACTIVATED PACKAGE DELIVERY LOCKER

CROSS REFERENCE TO RELATED APPLICATION

This application claims the benefit of U.S. provisional application 62/794,872 filed Jan. 21, 2019, and hereby incorporated by reference.

BACKGROUND OF THE INVENTION

The present invention relates generally to package delivery by flying drones and in particular to a locker system for receiving packages automatically from drones.

The delivery of packages to residences and businesses has increased dramatically with the move from "bricks and mortar" stores where customers visit a vendor's premises to online shopping and procurement where merchandise is delivered directly to the customers' premises.

A significant cost to product delivery is in the so-called "last mile" of the delivery where a delivery truck, after approaching the residence or business, must stop so that the driver may exit the vehicle to carry the package to customers building.

For this reason, there is considerable interest in drone delivery where one or more drones are dispatched from a delivery truck to complete the delivery. Such drones typically take the form of light-weight, battery-powered vertical takeoff and landing aircraft providing helicopter-like maneuverability allowing precise placement of delivered packages by a combination of radio and/or GPS guided motion.

Two significant obstacles to practical drone delivery include the challenge of placing the package in an appropriate location where it will be noticed and also protected from the weather and potential theft. Such locations can vary on an individual basis and are often associated with structures that would present hazards to drone navigation such as building overhangs, trees, shrubbery, and the like. A similar challenge is that of the noise and potential risk of injury to humans and pets when drones maneuver close to the ground for package delivery.

SUMMARY OF THE INVENTION

The present invention provides an automated drone-activated locker system presenting a fixed and easily identified location for drone delivery. The locker system may be removed from navigational hazards, for example, by being placed on top of a building or at distance from the building and traffic. In this former case, a dumbwaiter type mechanism may connect the delivery point in the drone-activated locker system to an interior of the building providing a convenient, climate-controlled location for retrieving the package.

Specifically, in one embodiment, the invention provides a drone delivery locker having a receiving compartment defining a package-receiving volume and a door movable with respect to the compartment between a closed position covering the compartment and an open position allowing receipt of the package downwardly into the package-receiving volume. A drone sensor operates to detect the presence of a drone near the receiving compartment for delivery of a package and communicates with a motor moving the door to open the door, according to a signal from the drone sensor indicating presence of a drone, for delivery of a package and close the door after this delivery.

It is thus a feature of at least one embodiment of the invention to provide an automated delivery locker for receipt of drone-carried packages thus allowing the locker to be placed remotely from interfering structures, humans, and pets.

The drone delivery locker may further include a package sensor sensing a package within the package receiving volume to transmit a package confirmation signal when a package has been received.

It is thus a feature of at least one embodiment of the invention to provide a confirmation of package delivery improving reliability in an automated package delivery context.

The drone delivery locker may further include a visual target fixed with respect to the compartment providing a machine-readable fiducial mark allowing alignment of the drone with the receiving compartment.

It is thus a feature of at least one embodiment of the invention to provide a locker that offers navigational aids to the drone allowing compact locker size commensurate with improved navigational accuracy.

The drone delivery locker may further include an elevator providing a platform within the receiving compartment to receive a package thereupon when the package is inserted in the receiving compartment and providing a motorized lift for delivering the package downwardly from the receiving compartment to a delivery compartment.

It is thus a feature of at least one embodiment of the invention to permit the locker location to be elevated, for example, to the roof of a building away from interfering structures, humans, and pets while still allowing convenient access to the delivered packages. It is another feature of at least one embodiment of the invention to move the package to a climate-controlled area allowing the delivery of items that might be adversely affected by extremes in temperature or the like.

The drone delivery locker may further include a package transport receiving packages in the delivery compartment to remove the packages from the delivery compartment.

It is thus a feature of at least one embodiment of the invention to provide a delivery locker suitable for areas that receive multiple deliveries and which can be automatically emptied.

The elevator may be activated by the drone sensor to move the platform between the receiving volume and delivery compartment as triggered by the drone.

It is thus a feature of at least one embodiment of the invention to provide a fully automated handling of the package on demand.

The platform may cooperate with the door to open the door when the platform arrives in the receiving compartment.

It is thus a feature of at least one embodiment of the invention to allow the elevator motor to simultaneously operate the elevator and the drone delivery locker doors reducing cost and complexity.

The door in the closed position may block precipitation ingress into the receiving compartment.

It is thus a feature of at least one embodiment of the invention to provide a watertight receiving compartment possible with automated motorized operation.

The door may provide for two door halves that in the closed position present an upwardly convex surface and which pivot about respective axes to move to the open position.

It is thus a feature of at least one embodiment of the invention to provide doors which operate naturally to shed moisture and other precipitation through an upwardly convex shape and which do not funnel moisture or the like into the receiving compartment as they open.

These particular objects and advantages may apply to only some embodiments falling within the claims and thus do not define the scope of the invention.

DETAILED DESCRIPTION OF THE PREFERRED EMBODIMENT

Figure 1:
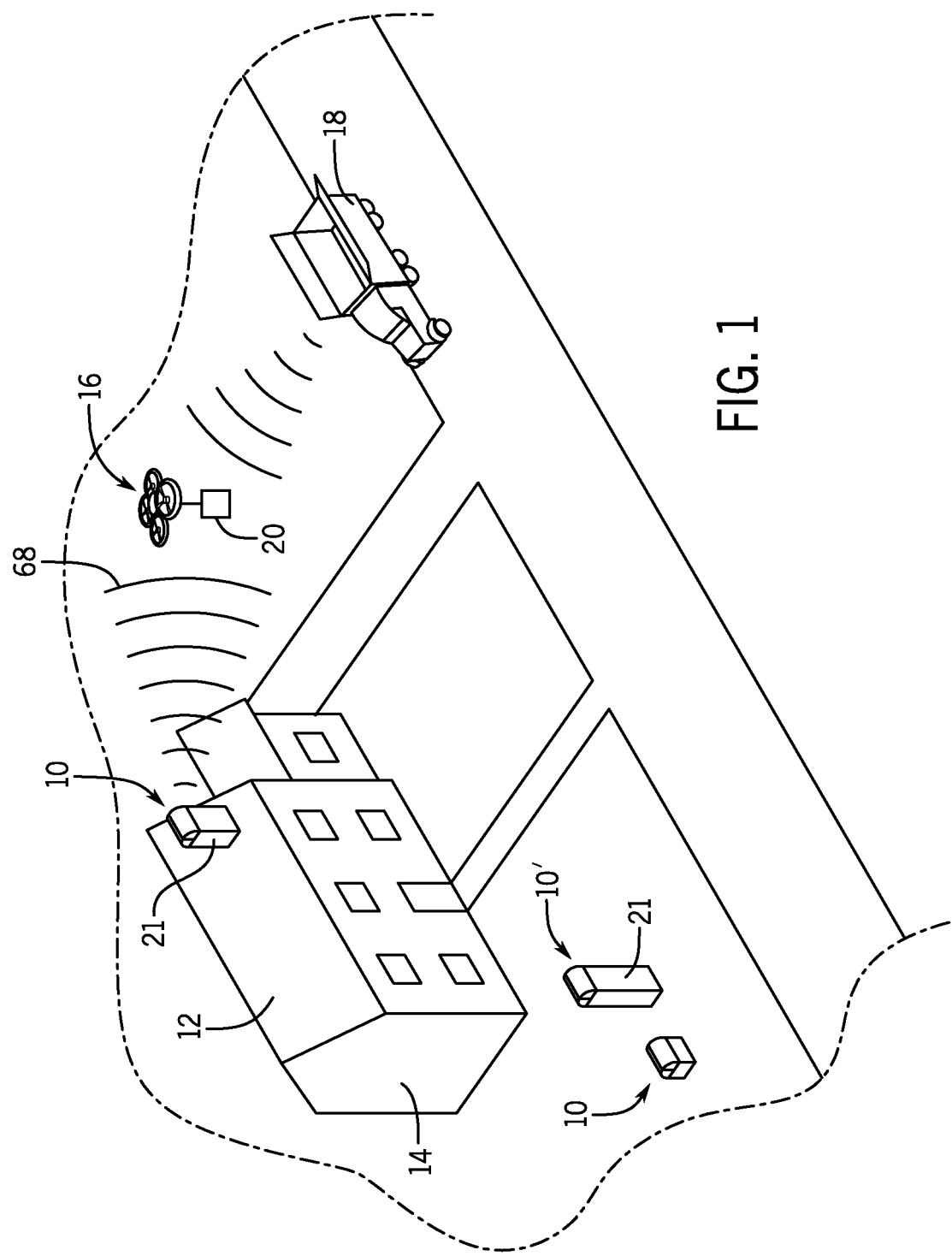
FIG. 1 is a perspective view of a residence having a drone-delivery locker according to the present invention positioned at a rooftop location and also showing a similar storage locker in freestanding tower configuration and in shorter pedestal configuration.

Referring now to FIG. 1, a drone delivery locker 10 of the present invention may be positioned on a roof 12 of a building 14, such as a home or the like, to extend upward therefrom free from interfering structure such as poles, shrubbery, and trees and from any danger of contact between a drone 16 and individuals, pets, or the like. Generally, the delivery locker 10 may include a short tower 21 allowing it to project above the roof and thus above any snow or debris levels. In some embodiments, the tower 21 may be sheathed with brick, simulated brick, or other material 19 (shown in FIG. 2) to visually coordinate with the house as a chimney or the like and may have a rectangular cross-section and a height of at least of three feet above the roof 14. Generally the tower 21 may proceed through the roof 12 to communicate with an elevator system as will be discussed below, and in this respect may be flashed and otherwise sealed in the manner of a chimney to prevent water ingress. It will be appreciated that a rooftop location both provides a generally unobstructed area for the drone 16 (defined by the roof planar area) typically free from other elevated structures and well above locations where contacts with individuals or pets would be likely.

During use, a delivery vehicle 18 will bring packages 20 to a general proximity of the building 14 and will release a drone 16 carrying a package 20 for delivery to the locker 10. The drone 16 may be guided by a combination of GPS signals and stored travel information and/or radio control from the vehicle 18 or from a remote system.

The invention also contemplates that the locker 10 may be positioned on a freestanding tower 21 above the ground or other pedestal taller than the receiving compartment to be discussed below.

Figure 2:
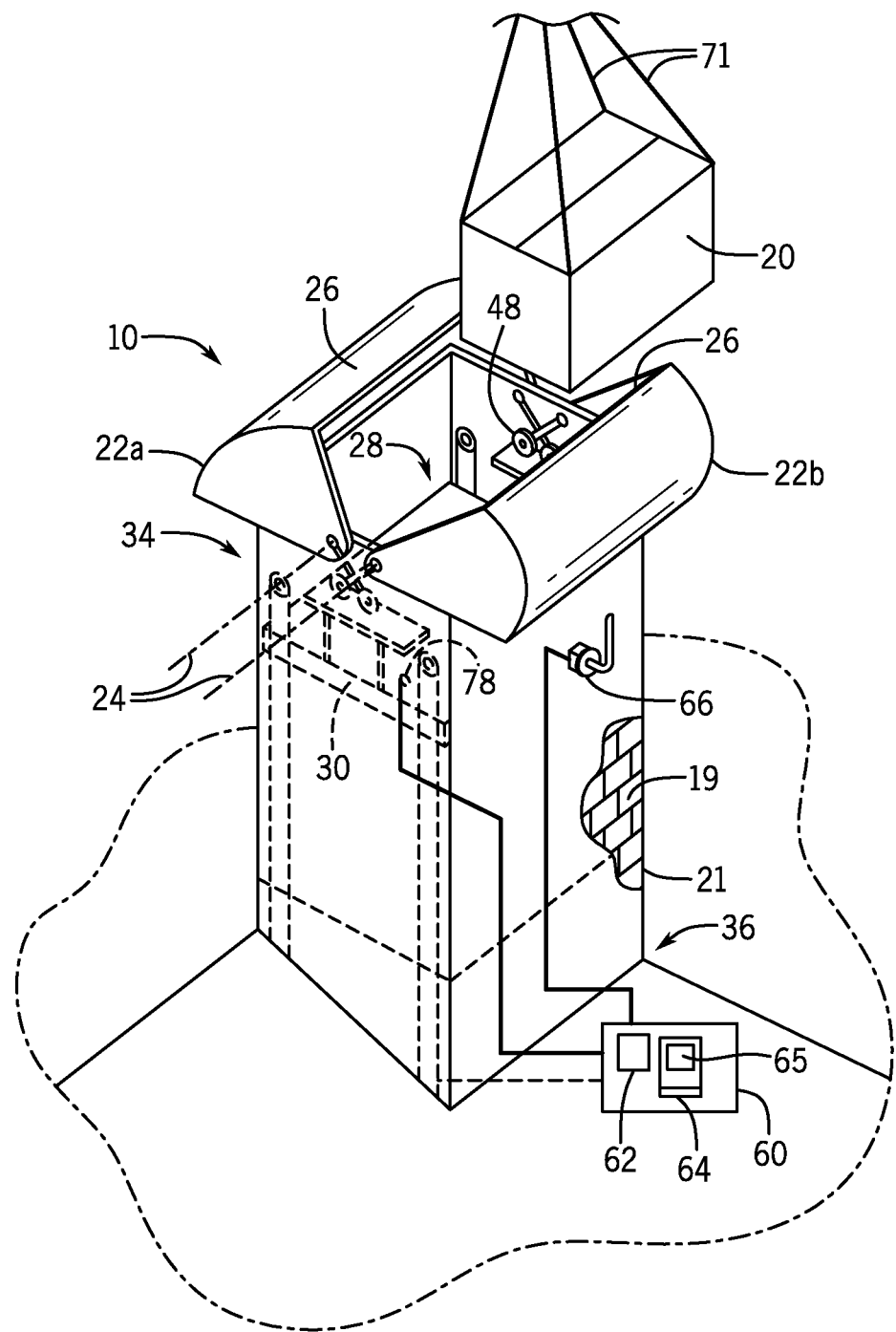
FIG. 2 is a perspective view of the delivery locker of FIG. 1 showing the doors in an open position as activated by an upwardly raised elevator platform that may also be retracted downwardly into the residence.
Figure 3:
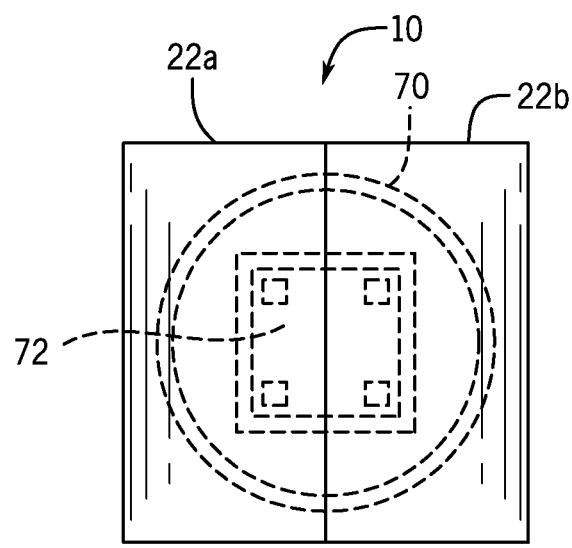
FIG. 3 is a top plan view of the locker of FIG. 2 with the doors in closed positions showing machine-readable targeting and identification fiducial markings for assisting in the navigation of the drone.
Figure 4:
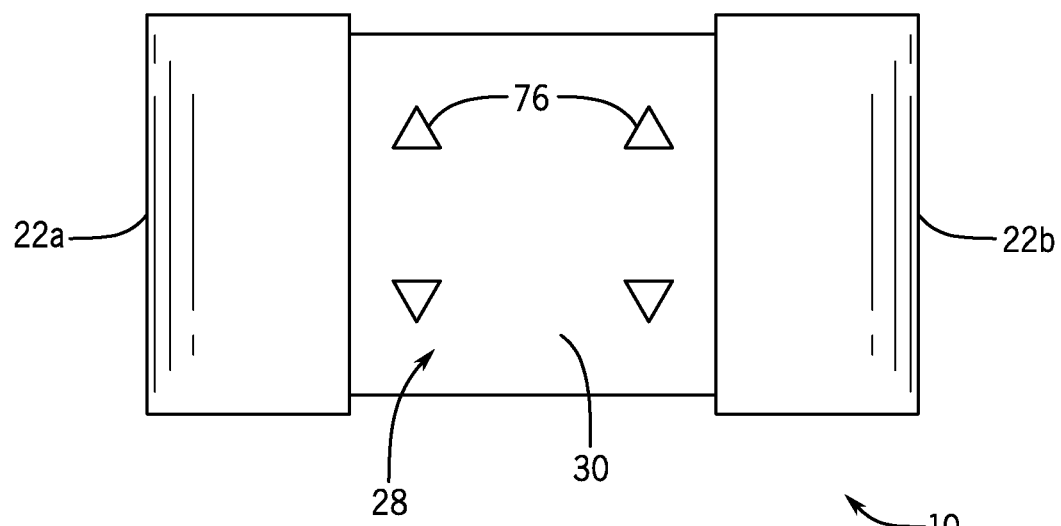
FIG. 4 is a figure similar to FIG. 3 showing the doors in open positions revealing additional machine-readable navigational markers.
Figure 5:
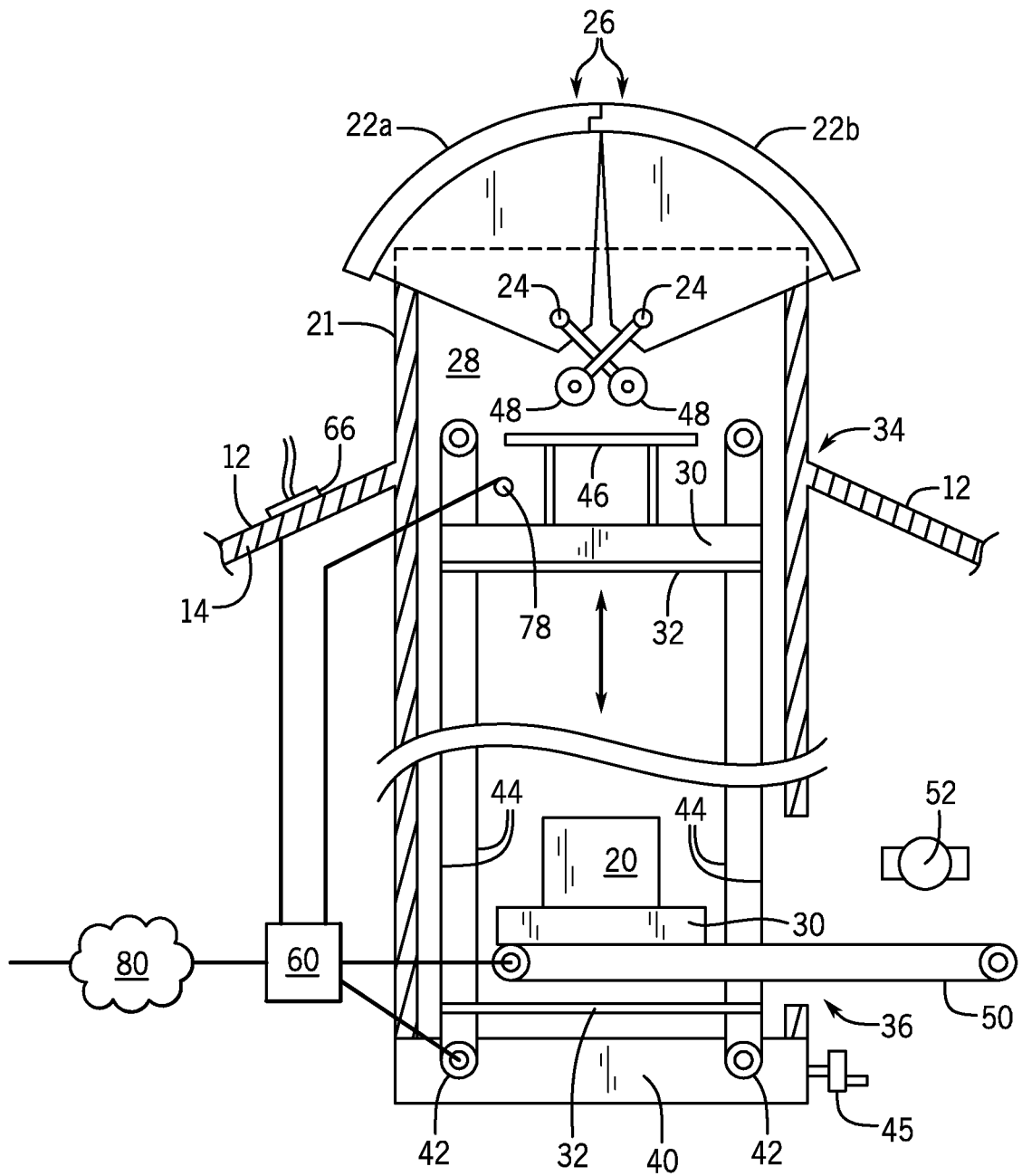
FIG. 5 is a cross-sectional fragmentary view of the locker of FIG. 2 showing the elevator mechanism for moving a package from the receiving volume to the delivery compartment (with the platform positioned respectively at each location) and showing an automatic package removal system removing packages from the delivery compartment.

Referring now to FIG. 2, in one embodiment, the drone delivery locker 10 may have a pair of clamshell doors 22a and 22b pivoting respectively about mutually parallel horizontal axes 24 so that the doors 22a and 22b may move between an open position (as shown in FIG. 2) with opposed door edges 26 of each of the doors 22a and 22b separated to reveal a receiving compartment 28. The receiving compartment 28 defines a receiving volume opening upward underneath the doors 22a and 22b when they are closed (as shown in FIG. 5).

In the closed state, the edges 26 abut at an apex of the surface defined by the doors 22 which is a convex surface sloping downward away from the edges 26 so that the doors 22 provide a roof that naturally resists moisture and precipitation and avoids funneling or introducing any accumulated moisture or precipitation into the receiving compartment 28 when the doors 22 are opened.

In one embodiment the upper, outer surface of each of the doors 22 conforms to an outer surface of a portion of a horizontally oriented cylinder centered around the respective axis 24 of that door 22a or 22b. This configuration of the doors 22 requires only sealing between the doors 22a and 22b at the edges 26 to provide robust waterproof protection of the receiving compartment 28. In this regard, edges 26 may be overlapped or may include weather-stripping or the like.

Receiving compartment 28 may present a generally rectangular box open at the top to receive a typical package sized for drone delivery passing downward through an upwardly open rim of the receiving compartment 28. The receiving compartment 28, for example, may have dimensions of at least 12 inches in width measured along axis 24, 12 inches in length measured horizontally and perpendicularly to axis 24, and six inches in depth vertically perpendicular to axis 24. In another embodiment, the receiving compartment 28 may be sized to receive a cube having dimensions of 24 inches on each side or less.

Referring also to FIG. 5, the bottom of the receiving compartment 28 may be formed by a movable platform 30 held on a platform carrier tray 32 that may be moved between an upper position 34 where it may receive a package 20 and a lowermost position 36 in a delivery compartment 38 within the building 14 where the package 20 may be removed or held in a climate controlled area. The platform 30 may provide a cushioned surface, for example, composed of an elastomer or elastomer foam to receive packages 20 dropped thereon from a modest height (24 inches) with no damage.

An elevator mechanism 40 may provide for motors, limit switches, and operating logic to turn drive sprockets 42 communicating with belts 44 that may raise and lower the carrier tray 32 (the latter attached to the belts 44) and thus the platform 30 between the upper position 34 and the lower position 36 controllably in the manner of elevator. A manual operator 45 may be provided in the event of power failure to allow activation of the elevator mechanism by hand.

As the platform 30 and carrier tray 32 rise to the upper position 34, an activating cam surface 46 may press against door actuation wheels 48 causing the doors 22 open to receive a package 20 into the receiving compartment 28. Conversely, when the platform 30 and carrier tray 32 descend under control of the elevator mechanism 40, the doors 22 may automatically close, removed from the cam surface 46 and driven either by weights, for example, at the wheels 48 or spring biasing (not shown). As the carrier tray 32 descends to the lower position 36 to the delivery compartment 38, it may deposit the platform 30 on a conveyor belt 50 extending horizontally out of the delivery compartment 38. In this way, the package 20 may be automatically removed from the delivery compartment 38, for example, carried by the platform 30 out of the delivery compartment 38 and then pushed from the conveyor belt 50 by an ejector 52 or the like moving crosswise to the motion provided by the conveyor belt 50. The ejector 52 slides the package 20 off of the platform 30. After package removal, conveyor belt 50 may reverse to position the platform 30 above the carrier tray 32 for the next cycle of package removal.

Referring now to FIGS. 1, 2, and 5, the various components of the locker 10 may be coordinated by a controller 60, for example, providing a processor 62 communicating with a computer memory 64 holding a stored program 65 for operation as will be described. The controller 60 may also communicate with a radio transceiver 66 to receive a radio signal 68 from the drone 16 indicating a package 20 is on route to the delivery locker 10. This radio signal 68 may, for example, be encrypted and encoded with a unique identification of the package delivery service, a particular order or invoice number, and the owner of the locker 10 so that the locker may respond appropriately only to deliveries intended for it and, in one option, only to packages on an approved white list of vendors.

Upon receipt of a proper radio signal 68, the controller 60 activates the elevator mechanism 40 to move the platform 30 upward. During that time, the drone 16 may locate itself above the doors 22a and 22b aligning itself with a fiducial pattern 70 whose dimensions allow the drone 16 to position itself in vertical alignment with the locker 10 and at a predetermined height above the locker 10. Centered within the fiducial pattern 70 may be an identification pattern 72 such as a QRS code positively identifying the locker 10 with respect to information known by the vendor. This information may be communicated to the drone 16 from the vehicle 18 which may hold all the order information in a preloaded database.

Once positioned, the drone 16 waits until the doors 22a and 22b are opened which may be indicated, for example, by a signal transmitted by the radio transceiver 66 or may be visually indicated by the revealing of a second target 76 on the platform 30 indicating not only that the doors 22 are open, but also providing navigational information and confirmation that the receiving compartment 28 is empty.

The package 20 may then be deposited by the drone 16 in the receiving compartment 28, for example, by releasing connecting harnesses 71. The receiving compartment 28 may provide internal guide surfaces (not shown) allowing the package 20 to be aligned on the platform 30 as it falls. When the package 20 is received by the receiving compartment 28, its presence is sensed by a sensor 78, for example, an optical sensor, ultrasound sensor, camera, or the like. The sensing triggers another transmission to the drone 16 through the controller 60 and radio transceiver 66 indicating that the package 20 has been properly received. When a camera is used as the sensor 78, an image may be captured of the package 20 for confirmation of the delivery.

At this point, the drone 16 returns to the vehicle 18 and the controller 60 moves the platform 30 downward to close the doors 22. When the package 20 arrives in the compartment 38, the controller 60 may activate the conveyor belt 50 and ejector 52 to automatically unload the package 20 if desired. The controller 60 may then communicate, for example, a reminder to the building owner that a package 20 has been delivered and may provide additional details about the delivery of that package 20 gleaned from the drone 16 during its communication with the controller 60 and/or an image from the camera sensor 78. The controller 60 may also provide this information to the vendor, for example, over the Internet 80.

The various benefits provided by the present invention include:
Providing a cost effective delivery system network for product distributors and online shopping retailers;
Deterring package theft;
Reducing weather and handling damage to shipped products;
Providing greater consumer access to product shipping in remote or rural locations;
Eliminating "at home" scheduling, or personal interaction with delivery carriers;
Providing energy and labor savings;
Providing reduced vehicle emissions from conventional trucking and van transports.

It will be appreciated that the fiducial patterns 70 and 72 and 76 used to assist alignment of the drone 16 and locker 10 may be passive visual marks or may include modulated lamps, for example, LEDs, that that can transmit a digital code or the like. Similarly, the radio radio transceiver 66 may be an optical communication system with type well known in the art for wireless communication.

It will be appreciated that a digital record of each delivery may be recorded by the controller 60 and that the controller 60 may receive advanced information about the delivery of packages, for example, by communication over the Internet 80 or the like.

A typical delivery sequence involves following steps:
A consumer orders product online, by email, or by phone, and confirms a drone delivery option;
Delivery is scheduled by the distributor and assigned to the appropriate location, and the database is consulted to determine that the consumer has a compatible drone locker and confirms location and other protocol information;
The distributor determines routing, timing, and tracking of the drone and may communicate with the drone locker to confirm its status as operational;
The drone locker is programmed to detect and receive the delivery initiating the drop sequence including opening upon proximity of the drone and confirming receipt of the package;
The delivery occurs and is verified by built-in sensors and/or photo imagery that can be transmitted to the vendor and the customer alike to confirm proper delivery of the package;
The package is retrieved by the consumer from an interior portal; and
The catch platform detects removal and the lift is reset for next use.

Note that only low-voltage components (radio signals and sensors) need to be located above the roofline or exposed exterior structure surfaces. No motors or hydraulics are required above this level as well.

Additional Locker Features

Generally, the material of the locker 10 will be constructed of lightweight weather resistant material such as ultraviolet stabilized plastics or aluminum materials and construction that also provide minimal roof load.

An air and weather-tight clamshell hatch mechanism with interlocking seals and contour shape may be used to deflect snow and rain.

The locker is raised above the height of the roof plane, and snow or debris levels.

The locker provides an attractive contour shape with "no maintenance" surfaces.

The locker provides a cushioned air-drop platform with a grip surface.

The locker provides guides to direct packages to center of platform.

The locker provides a manual/mechanical override to open hatch in case of power failure via a unique key lock.

Manufacturing Options

It is contemplated that locker 10 may include at least three versions including:

A rooftop located locker 10 associate with an elevator transferring packages into an interior, climate-controlled environment (house, condo, apartment, small commercial building). This is proposed for new construction.

A freestanding "Birdbath" unit located typically at grade, preferably in a secured yard or enclosure. This unit is not integrated with an elevator system, though does secure items for later retrieval. This is proposed for rural, suburban, or collective shared use by apartment dwellers or co-workers.

A retro-fit "chimney style" shaft attachment to an existing structure. The package access point will be within the climate-controlled interior and through an exterior wall penetration or portal.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What I claim is:

1. A drone delivery locker comprising:
   a receiving compartment defining a package-receiving volume;
   a door movable with respect to the compartment between a closed position covering the compartment and an open position allowing receipt of the package downwardly into the package-receiving volume;
   a drone sensor operating to detect the presence of a drone near the receiving compartment for delivery of a package;
   a motor communicating with the door to open the door, according to a signal from the drone sensor indicating presence of a drone, for delivery of a package and close the door after this delivery;
   further including an elevator providing a carrier tray within the receiving compartment to receive a package thereupon when the package is inserted in the receiving compartment and providing a lift for moving the carrier tray downwardly from the receiving compartment to a delivery compartment and upwardly from the delivery compartment to the receiving compartment; and
   further including a tower adapted for extending upwardly through a roof of a building and extending into the building and wherein the elevator moves the carrier tray vertically between a location outside the building proximate to an upper end of the tower and a delivery compartment within the building proximate to a lower end of the tower; and
   wherein the door provides for two door halves that in the closed position present an upwardly convex surface and which pivot about respective axes to move to the open position, whereby the two door halves open and close by cam surfaces which are connected to and move with the carrier tray as the carrier tray moves up and down.

2. The drone delivery locker of claim 1 further including a package sensor sensing a package within the package-receiving volume to transmit a package confirmation signal when a package has been received.

3. The drone delivery locker of claim 1 further including a visual target fixed with respect to the compartment providing a machine-readable fiducial mark allowing alignment of the drone with the receiving compartment and including coded information adapted to identify the locker to a vendor.

4. The drone delivery locker of claim 1 further including a package transport receiving packages in the delivery compartment to remove the packages from the delivery compartment.

5. The drone delivery locker of claim 1 wherein the elevator is activated by the drone sensor to move the platform between the receiving volume and delivery compartment as triggered by the drone.

6. The drone delivery locker of claim 1 wherein the lift is motorized and operates to open the door when the platform arrives in the receiving compartment.

7. The drone delivery locker of claim 1 wherein the door in the closed position blocks precipitation ingress into the receiving compartment.

8. The drone delivery locker of claim 1 wherein the door halves are gravity biased toward the closed position.

9. The drone delivery locker of claim 1 wherein adjacent edges of the door halves overlap in the closed position.

10. The drone delivery lock claim 1 further including a controller communicating with the lift and providing a signal to a user indicating a receipt of a package into the locker.

\* \* \* \* \*